(12) United States Patent
Kurosawa (10) Patent No.: US 6,561,216 B2
(45) Date of Patent: May 13, 2003

(54) COMBINED SENSOR AND FLOW CONTROLLER PROVIDED WITH COMBINED SENSOR

(75) Inventor: Kenichi Kurosawa, Matsudo (JP)

(73) Assignee: SMC Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/764,097

(22) Filed: Jan. 19, 2001

(65) Prior Publication Data

US 2001/0009163 A1 Jul. 26, 2001

(30) Foreign Application Priority Data

Jan. 20, 2000 (JP) ........................................ 2000-012127

(51) Int. Cl.[7] .............................. G05D 7/06; G01L 7/08
(52) U.S. Cl. .................... 137/487.5; 137/486; 137/557; 73/714; 374/143
(58) Field of Search ........................... 73/714; 137/486, 137/487.5, 557; 374/143

(56) References Cited

U.S. PATENT DOCUMENTS

| | | | | |
|---|---|---|---|---|
| 4,986,127 A | * | 1/1991 | Shimada et al. | ............ 374/143 |
| 5,187,984 A | * | 2/1993 | Mosser et al. | ................. 338/4 |
| 5,259,248 A | * | 11/1993 | Ugai et al. | ................... 374/143 |
| 5,463,904 A | * | 11/1995 | Kalinoski | ..................... 73/719 |
| 5,469,749 A | * | 11/1995 | Shimada et al. | ............... 73/721 |
| 5,791,369 A | * | 8/1998 | Nishino et al. | ........... 137/487.5 |
| 5,820,262 A | * | 10/1998 | Lechner | ....................... 374/143 |
| 5,868,159 A | * | 2/1999 | Loan et al. | ............... 137/487.5 |

FOREIGN PATENT DOCUMENTS

JP          03018735 A   *   1/1991   .............. G01L/9/12

* cited by examiner

Primary Examiner—Michael Powell Buiz
Assistant Examiner—Ramesh Krishnamurthy
(74) Attorney, Agent, or Firm—Paul A. Guss (57) ABSTRACT

A flow controller for controlling a flow rate of a fluid flowing through a fluid passage comprises a control valve for which a degree of opening of a valve is adjusted by a control signal, an orifice arranged on an outflow side of the control valve, a combined sensor arranged on an inflow side of the orifice for almost simultaneously detecting a pressure and a temperature of the fluid, and a control circuit. The combined sensor includes a pressure-detecting element for deriving a detection signal corresponding to the pressure of the fluid, and a temperature-detecting element for deriving a detection signal corresponding to the temperature of the fluid. The pressure-detecting element and the temperature-detecting element are arranged closely to one another on an identical surface of a pressure-receiving section.

9 Claims, 8 Drawing Sheets

FIG. 8 ically detecting the pressure and the temperature of a fluid, and a flow controller provided with the combined sensor for controlling the flow rate of a fluid flowing through a fluid passage.

COMBINED SENSOR AND FLOW CONTROLLER PROVIDED WITH COMBINED SENSOR

BACKGROUND OF THE INVENTION

1. Field of the Invention

The present invention relates to a combined sensor for almost simultaneously detecting the pressure and the temperature of a fluid, and a flow controller provided with the combined sensor for controlling the flow rate of a fluid flowing through a fluid passage.

2. Description of the Related Art

It is necessary to accurately control the flow rate of a process fluid to be supplied to a processing equipment, for example, in a dry etching apparatus and a thin film-producing apparatus in the process for producing semiconductors. To control the flow rate of the process fluid, a flow controller is arranged in a fluid passage to supply the process fluid to the processing equipment.

The flow controller comprises a pressure sensor for detecting the pressure of the fluid, a temperature sensor for detecting the temperature, and a control valve for controlling the flow rate. Detection signals detected by the pressure sensor and the temperature sensor are introduced into a control circuit in the flow controller respectively. The flow rate of the fluid is calculated based on the detection signal in the control circuit. Thereafter, the flow rate is controlled by adjusting a degree of opening of the control valve depending upon a control signal transmitted from the control circuit to the control valve.

In the conventional flow controller, the pressure sensor and the temperature sensor are arranged separately one by one, and use mutually different detection positions for detecting the pressure and the temperature of the fluid. For the above reason, the following drawback arises. That is, a large space is required for both of the detection positions, and the flow controller itself tends to have a large size. Consequently, a large space is required for installation of the flow controller.

SUMMARY OF THE INVENTION

A general object of the present invention is to provide a combined sensor which can reduce the space of the detection positions and realize the miniaturization by closely arranging on an identical surface the detection positions for outputting detection signals corresponding to the pressure and the temperature of a fluid respectively.

A principal object of the present invention is to provide a flow controller which is provided with a miniaturized combined sensor and which can reduce the installation space.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
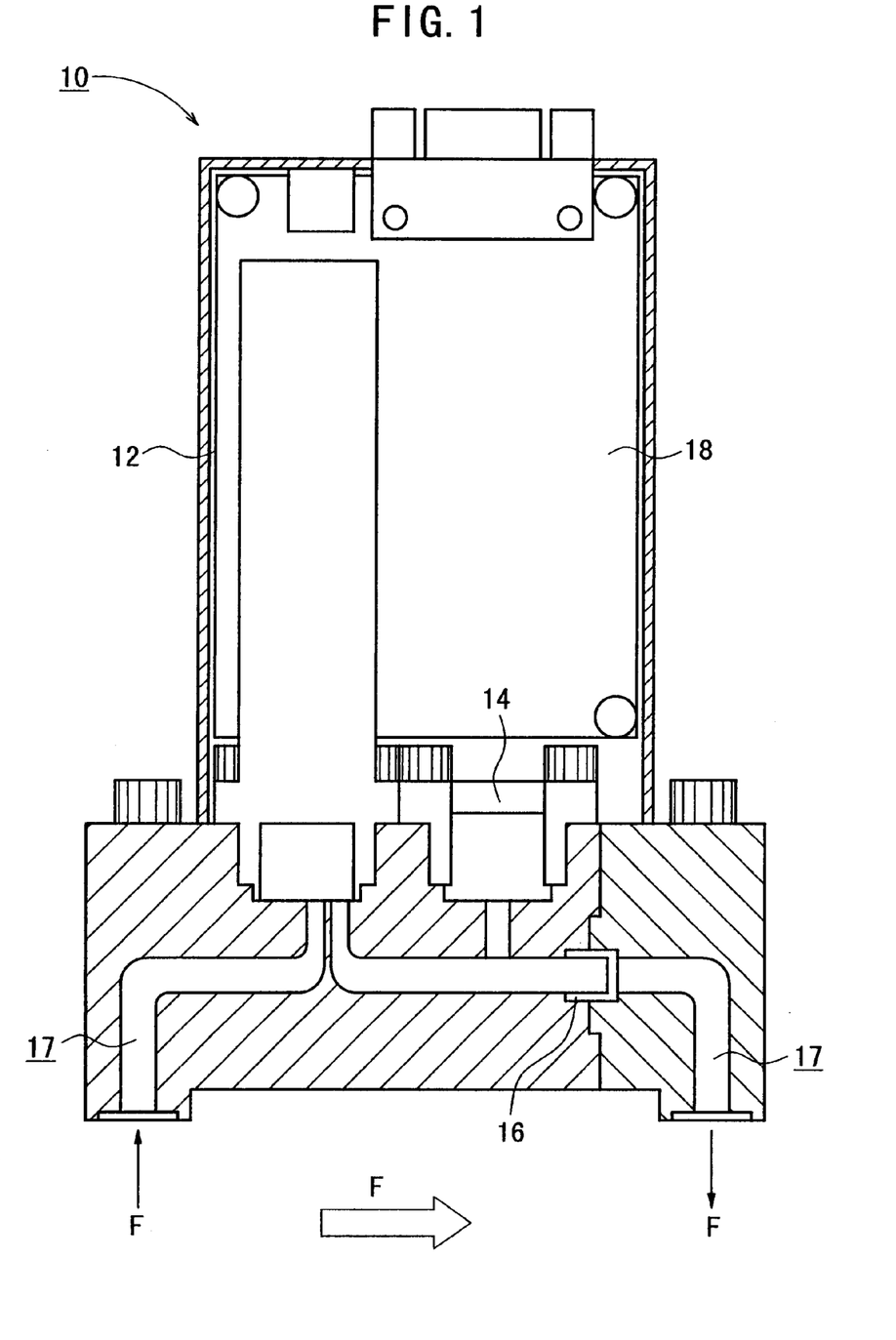
FIG. 1 shows a vertical sectional view illustrating an arrangement of a flow controller according to a first embodiment of the present invention.
Figure 2:
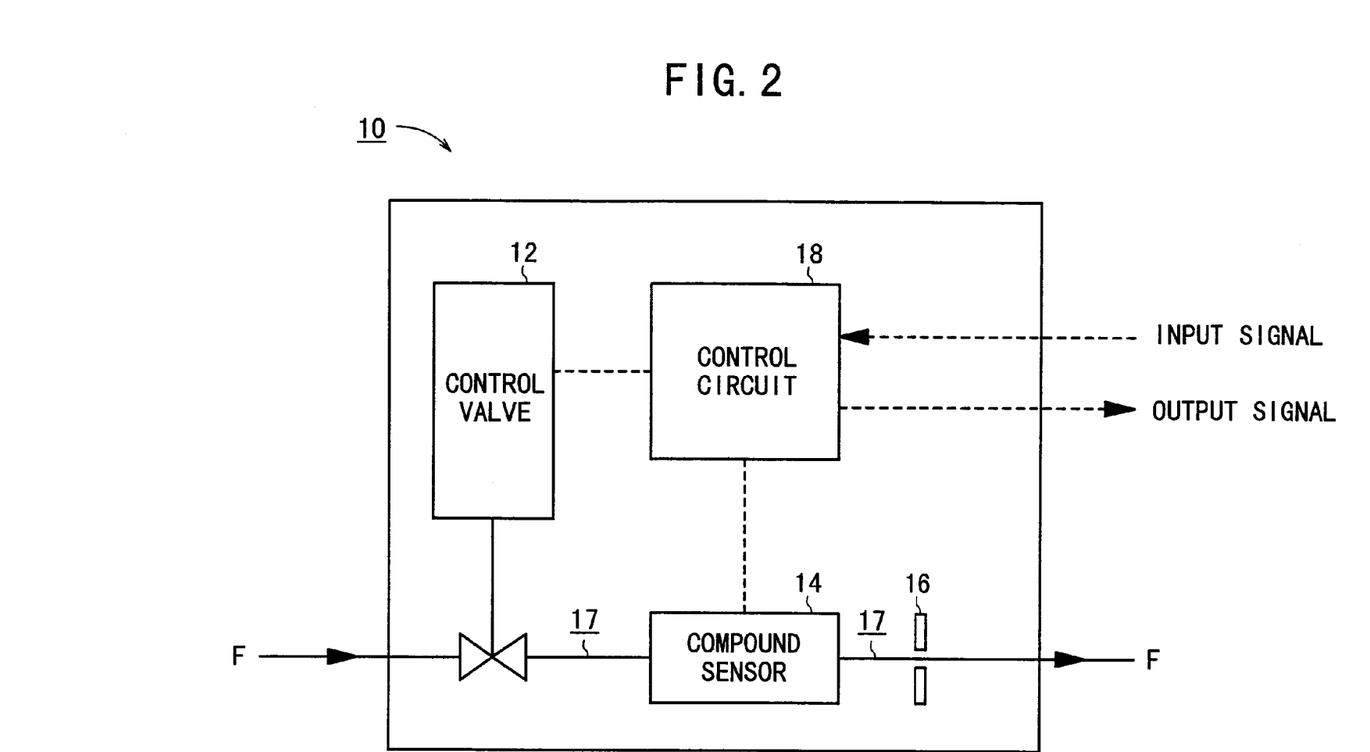
FIG. 2 shows a block diagram depicting an illustrative arrangement of the flow controller according to the first embodiment.

A flow controller 10 according to a first embodiment of the present invention is shown in FIGS. 1 and 2. The flow controller 10 is generally connected to a fluid supply passage (not shown) for a process fluid (for example, air) to be used for an unillustrated apparatus for producing semiconductor parts. The flow controller 10 controls the flow rate of the fluid flowing through the fluid supply passage.

The flow controller 10 comprises a control valve 12, an orifice 16, a combined sensor 14, and a fluid passage 17. The degree of opening of the control valve 12 is adjusted by a control signal. The orifice 16 is arranged on the outflow side of the control valve 12. The combined sensor 14 is arranged on the inflow side of the orifice 16 for detecting the pressure and the temperature of the fluid (F). The fluid passage 17 is provided for the fluid (F).

The fluid (F) of which the flow rate is controlled by the flow controller 10 is a gas. The flow velocity of the fluid (F) passing through the orifice 16 is the sound velocity.

The flow controller 10 has a control circuit 18. The detection signals corresponding to the pressure and the temperature of the fluid (F) sensed by the combined sensor 14 are introduced respectively into the control circuit 18. Further, a control signal for adjusting the degree of the opening of the control valve 12 is transmitted from the control circuit 18 as well.

The hole (not shown) formed for allowing the fluid (F) to pass through the orifice 16 has a cross-sectional area previously set to have a predetermined value used to calculate the flow rate of the fluid (F) as described later on.

Next, the arrangement of the combined sensor 14 will be explained with reference to FIGS. 3 and 4.

Figure 3:
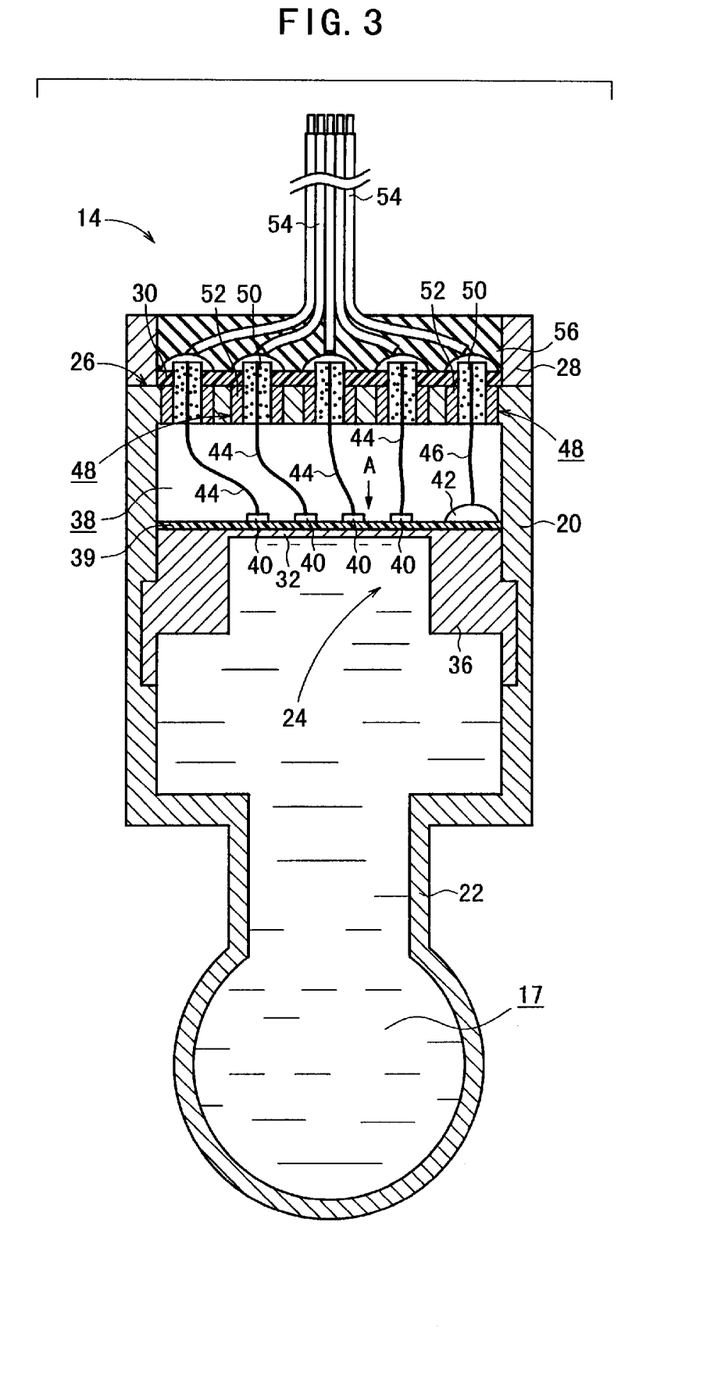
FIG. 3 shows, with partial omission, a vertical sectional view illustrating a combined sensor provided in the flow controller.

As shown in FIG. 3, the combined sensor 14 includes a casing 20, a pressure-receiving section 24, a ring 28, and a base board 30. The casing 20 is made of metal which is formed with a projection 22 connected to the fluid passage 17. The pressure-receiving section 24 is made of stainless steel (for example, SUS316 based on the standard of JIS) fastened in the casing 20 and including a recess having a rectangular vertical cross section. The ring 28 is secured to an upper surface 26 of the casing 20. The base board 30 is made of resin.

The pressure-receiving section 24 has a thin-walled section 32 formed at a substantially central portion, and a thick-walled section 36 formed at the circumferential edge of the thin-walled section 32. The thin-walled section 32 and the thick-walled section 36 are integrally formed. A chamber 38 closed by the pressure-receiving section 24 is formed in the casing 20.

The surface of the pressure-receiving section 24 on the side of the chamber 38 is coated with an insulating layer 39 made of resin. Pressure-detecting elements 40 and a temperature-detecting element 42 are arranged closely to one another on the insulating layer 39. The pressure-detecting elements 40 are secured to the thin-walled section 32 while the temperature-detecting element 42 is secured to the thick-walled section 36. The shapes and other features of the pressure-detecting element 40 and the temperature-detecting element 42 will be described in detail later on. The surface of the pressure-receiving section 24 on the opposite side to the chamber 38 communicates with the fluid passage 17. Hence, the surface of the pressure-receiving section 24 constantly contacts with the fluid (F).

A plurality of lead wires 44 for the pressure-detecting elements 40 and a lead wire 46 for the temperature-detecting element 42 penetrate through holes 48 formed to communicate with the casing 20 and the base plate 30. A plurality of the lead wires 44 and the lead wire 46 are bonded to the base plate 30. The hole 48 has a larger diameter on the side of the casing 20 than that on the side of the base plate 30.

The hole 48 is closed by heat-insulating rubber 50 and glass 52 to insulate the lead wires 44 and the lead wire 46. The heat-insulating rubber 50 and the glass 52 improve the heat-insulating effect of the lead wires 44 and the lead wire 46. The heat-insulating rubber 50 and the glass 52 maintain the air-tightness of the chamber 38 as well. Therefore, the chamber 38 formed by the casing 20 and the pressure-receiving section 24 is kept in vacuum.

A plurality of lead wires 54 connected to the control circuit 18 are bonded to bonding portions of the lead wires 44 and the lead wire 46 on the base plate 30. Accordingly, the detection signals outputted by the pressure-detecting elements 40 and the temperature-detecting element 42 are introduced into the control circuit 18 respectively. To insulate the bonding portions of the lead wires 44 and the lead wire 46, silicone rubber mold which is a heat-insulating material 56 is charged onto the base plate 30 in the ring 28. As a result, the silicone rubber mold is flushed with the ring 28.

Explanation will now be made with reference to FIG. 4 for the arrangement and other features of the pressure-detecting element 40 and the temperature-detecting element 42.

The pressure-detecting element 40 senses the pressure of the fluid (F) to derive the detection signal corresponding to the pressure. As shown in FIG. 4, strain gauges to serve as the pressure-detecting elements 40 are arranged substantially on a straight line at a substantially central portion of the pressure-receiving section 24. The pressure-detecting elements 40 are brazed with solder to the insulating layer 39 formed on the thin-walled section 32 of the pressure-receiving section 24.

The temperature-detecting element 42 senses the temperature of the fluid (F) to derive the detection signal corresponding to the temperature. The temperature-detecting element 42 is made of CrN (chromium nitride) having its resistance value varied depending on the change of the temperature. As shown in FIG. 4, the temperature-detecting element 42 is brazed with solder to the insulating layer 39 formed on the thick-walled section 36 of the pressure-receiving section 24 in the same manner as the pressure-detecting elements 40 described above.

Figure 4:
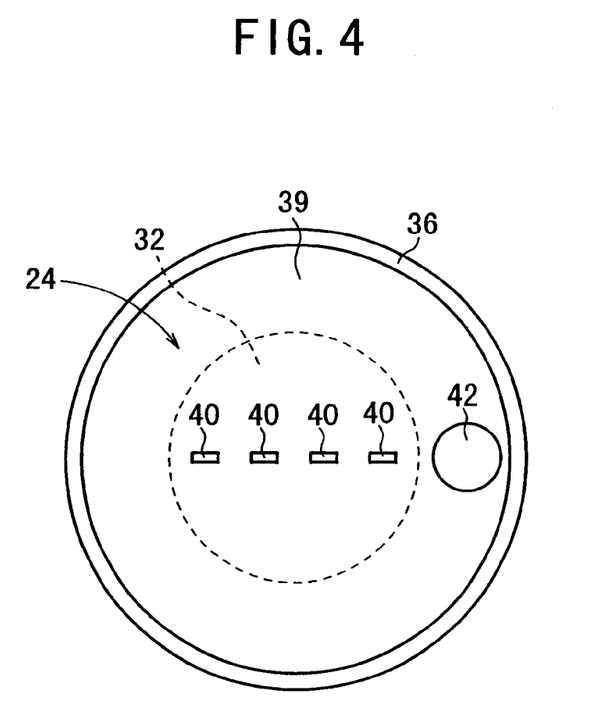
FIG. 4 shows a view as viewed in a direction of the arrow A shown in FIG. 3.

The pressure-detecting elements 40 and the temperature-detecting element 42 are arranged closely to one another without any mutual interference on the insulating layer 39 (see FIG. 4).

The flow controller 10 according to the first embodiment of the present invention is basically constructed as described above. Next, the function and effect of the flow controller 10 will be explained.

When, the fluid (F) flows from the control valve 12 through the combined sensor 14 and the orifice 16, the flow rate of the fluid (F) is controlled. Thereafter, the fluid (F) is introduced into the unillustrated processing equipment. During above process, the detection signals corresponding to the pressure and the temperature are derived by the combined sensor 14 to calculate the flow rate of the fluid (F).

As described above, the surface of the thin-walled section 32 of the pressure-receiving section 24 on the opposite side to the chamber 38 constantly contacts with the fluid (F). Therefore, the surface is pressurized by the fluid (F). Accordingly, the detection signal corresponding to the pressure of the fluid (F) is derived by the pressure-detecting elements 40 secured to the insulating layer 39 on the thin-walled section 32. An error of detecting the amount of strain of the pressure-receiving section 24 corresponding to the pressure of the fluid (F) can be avoided as less as possible because the pressure-detecting elements 40 are secured to the insulating layer 39 on the thin-walled section 32.

The temperature-detecting element 42 is secured to the thick-walled section 36 of the pressure-receiving section 24. The temperature of the fluid (F) is transmitted to the pressure-receiving section 24, and the resistance value of the temperature-detecting element 42 is changed. Thus, the detection signal corresponding to the temperature of the fluid (F) is sensed. The temperature-detecting element 42 is prevented from undergoing any mechanical strain caused by any factor other than the temperature of the fluid (F) by securing the temperature-detecting element 42 to the thick-walled section 36.

The detection signals corresponding to the detected pressure and the detected temperature of the fluid (F) are introduced into the control circuit 18 respectively. The flow rate of the fluid (F) is calculated by the control circuit 18 based on the introduced detection signals corresponding to the pressure and the temperature of the fluid (F). In the first embodiment, the fluid (F) of which the flow rate is controlled by the flow controller 100 is the gas (for example, air). The flow velocity of the fluid (F) passing through the orifice 16 is the sound velocity. Therefore, the flow rate can be calculated by the following expression (1).

$$Q = 1.85 S \cdot P_H \sqrt{\frac{273}{T}} \tag{1}$$

In the expression (1), Q represents the volume flow rate (1/second), S represents the cross-sectional area (mm$^2$) of the unillustrated hole formed for the orifice 16, $P_H$ represents the fluid pressure (MPa abs), and T represents the temperature (K) of the fluid.

If the calculated flow rate is not a predetermined one, the control signal for adjusting the degree of the opening of the control valve 12 is transmitted from the control circuit 18 to the control valve 12. Accordingly, since the degree of the opening of the control valve 12 is adjusted, the fluid (F) can be allowed to flow at a predetermined flow rate.

Figure 5:
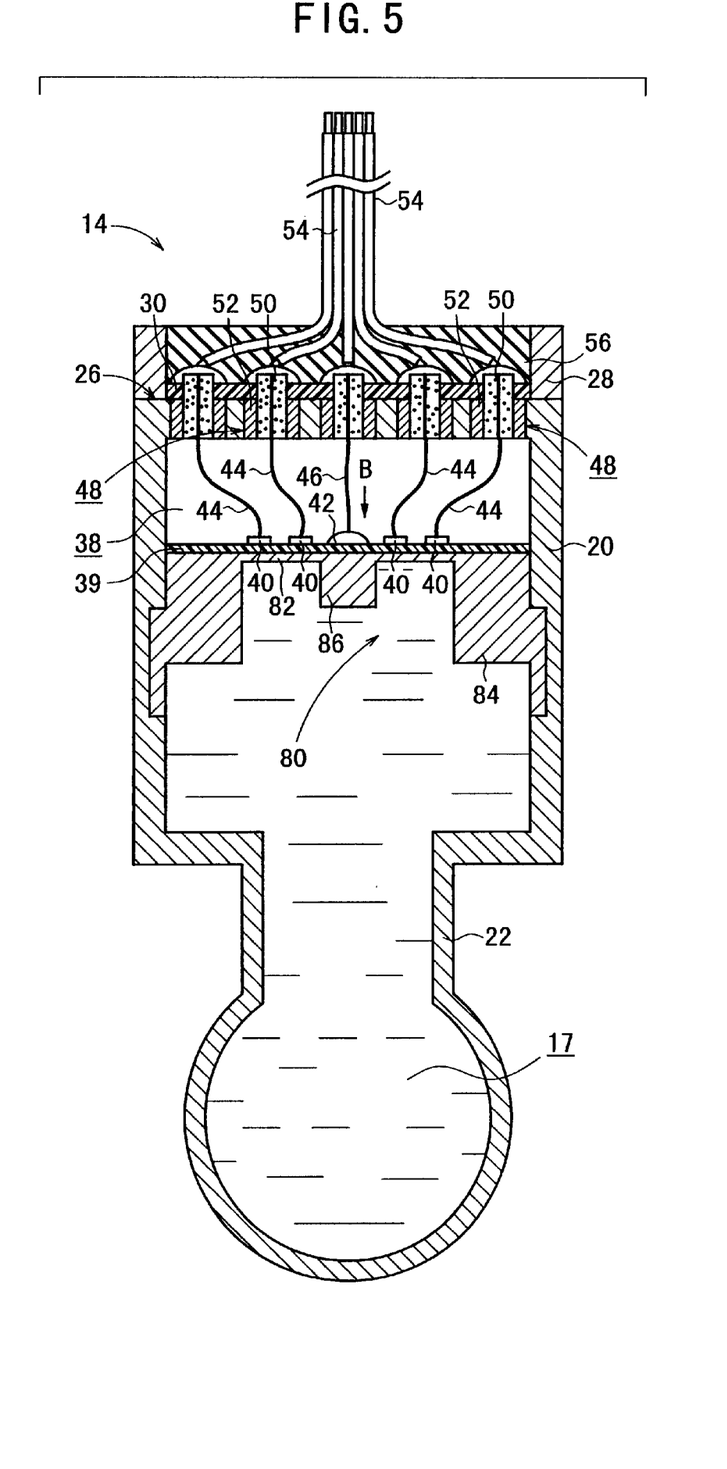
FIG. 5 shows, with partial omission, a vertical sectional view illustrating a combined sensor based on the use of a pressure-receiving section according to a modified embodiment.

Instead of the pressure-receiving section 24 used for the flow controller 10 according to the first embodiment, it is also preferable to use a pressure-receiving section 80 as shown in a modified embodiment in FIG. 5. The pressure-receiving section 80 has a thin-walled section 82 having an annular configuration. Further, the pressure-receiving section 80 has a first thick-walled section 84 and a second thick-walled section 86 having mutually different thickness. The first thick-walled section 84 is provided at the circumferential edge of the thin-walled section The second thick-walled section 86 is provided on the surface at a substantially central portion of the thin-walled section 82 for the purpose of contacting with the fluid (F). The thin-walled section 82 and the first and second thick-walled sections 84, 86 are integrally formed.

The surface of the pressure-receiving section 80 on the side of the chamber 38 is coated with the insulating layer 39. The temperature-detecting element 42 is brazed to the insulating layer 39 formed on the second thick-walled section 86. Therefore, the temperature-detecting element 42 can be prevented from undergoing any mechanical strain caused by any factor other than the temperature of the fluid (F).

Figure 6:
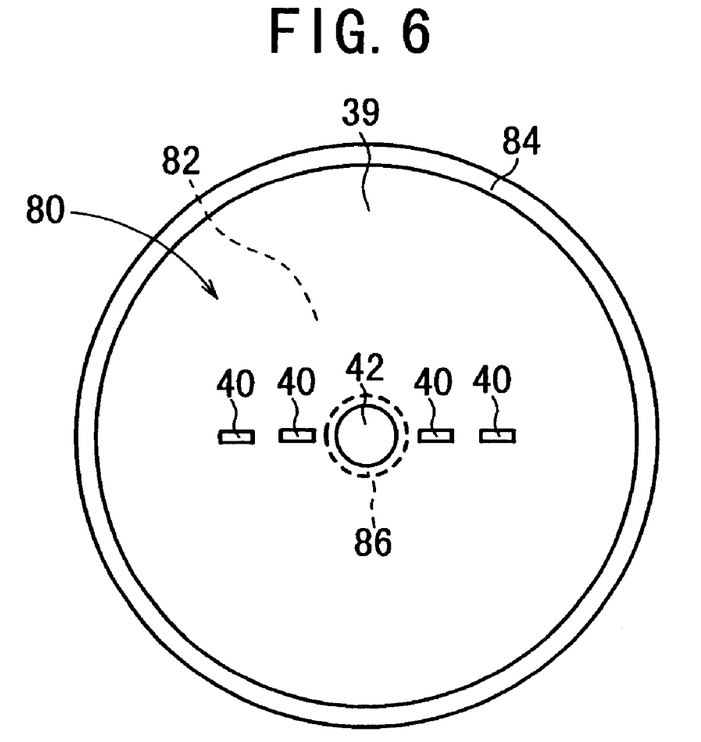
FIG. 6 shows a view as viewed in a direction of the arrow B shown in FIG. 5.

The temperature-detecting element 42 is arranged at the substantially central portion corresponding to the second thick-walled section 86. A plurality of the pressure-detecting elements 40 is arranged substantially on the straight line with the temperature-detecting element 42 intervening therebetween. The temperature-detecting element 42 and a plurality of the pressure-detecting element are arranged closely to one another on the identical plane without any mutual interference (see FIG. 6).

Additionally, the pressure-receiving section 80 can be used for a flow controller 100 according to a second embodiment described below.

Next, the flow controller 100 according to the second embodiment will be explained with reference to FIGS. 7 and 8. As for the flow controller 100 according to the second embodiment, the same constitutive components as those of the flow controller 10 according to the first embodiment described above are designated by the same reference numerals, and the detailed explanation thereof will be omitted.

The flow controller 100 according to the second embodiment is constructed in almost the same manner as the flow controller 10 according to the first embodiment. However, the arrangement of combined sensors 14 and the number of arranged combined sensors 14 are different.

Figure 7:
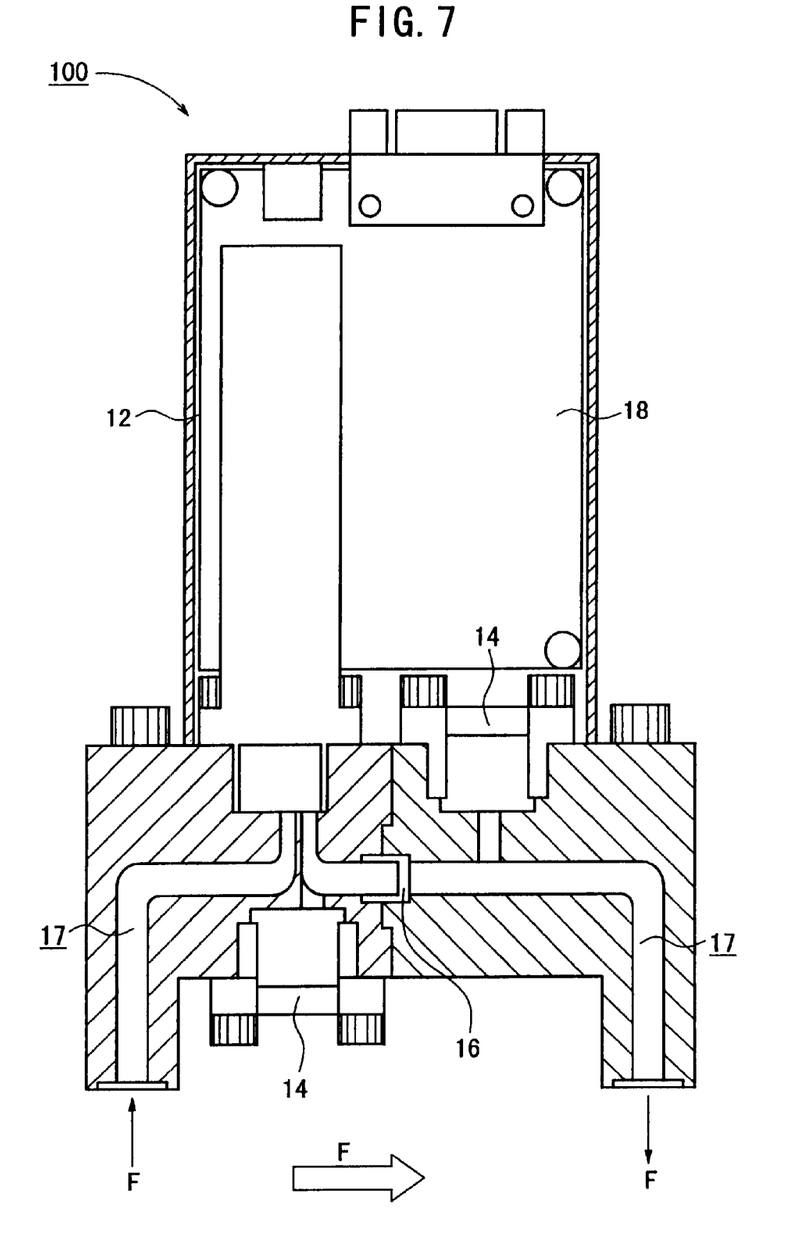
FIG. 7 shows a vertical sectional view illustrating an arrangement of a flow controller according to a second embodiment of the present invention.
Figure 8:
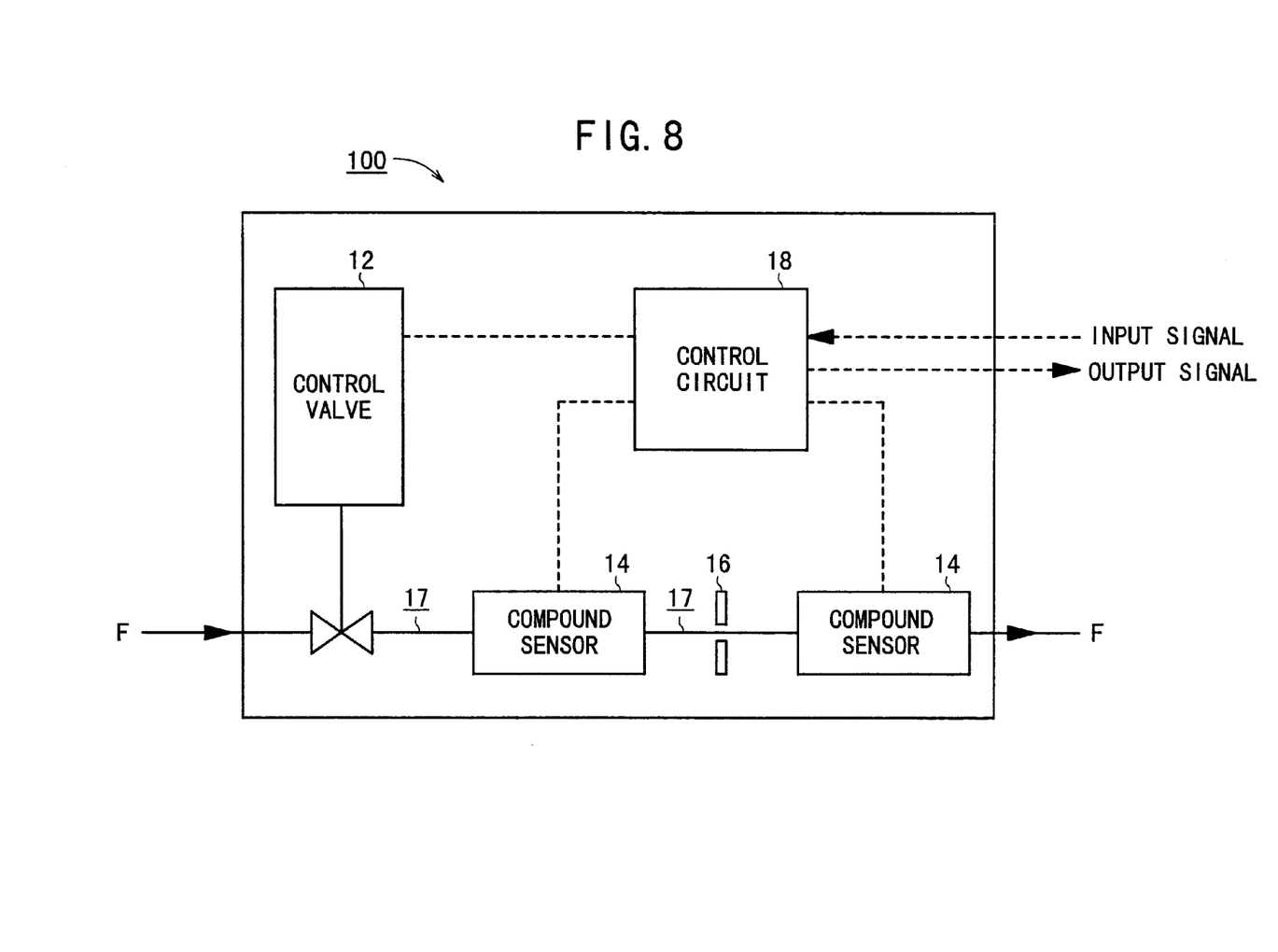
FIG. 8 shows a block diagram depicting an illustrative arrangement of the flow controller according to the second embodiment.

As shown in FIGS. 7 and 8, the flow controller 100 according to the second embodiment comprises the combined sensors 14 for detecting the pressure and the temperature of the fluid (F). The combined sensors 14 are arranged on the inflow and the outflow sides of the orifice 16. The fluid (F) of which the flow rate is controlled by the flow controller 100 is the gas. The flow velocity of the fluid (F) passing through the orifice 16 is subsonic (less than the sound velocity).

The function and effect of the flow controller 100 according to the second embodiment are almost the same as the function and effect of the flow controller 10 according to the first embodiment described above.

However, in the second embodiment, the fluid (F) of which the flow rate is controlled by the flow controller 100 is the gas (for example, air). The flow velocity of the fluid (F) passing through the orifice 16 is subsonic (less than the sound velocity). Therefore, when the flow rate is calculated by the control circuit 18, the flow rate is expressed by the following expression (2).

$$Q = 3.77 S \sqrt{P_L(P_H - P_L)} \sqrt{\frac{273}{T}} \qquad (2)$$

In the expression (2), Q represents the volume flow rate (1/second), S represents the cross-sectional area (mm$^2$) of the unillustrated hole formed for the orifice 16, $P_H$ represents the fluid pressure (MPa abs) on the inflow side of the orifice 16, $P_L$ represents the fluid pressure (MPa abs) on the outflow side of the orifice 16, and T represents the temperature (K) of the fluid on the outflow side of the orifice 16.

It is a matter of course that the combined sensor and the flow controller provided with the combined sensor according to the present invention are not limited to the embodiments described above, which may be embodies in other various forms without deviating from the gist or essential characteristics of the present invention.

What is claimed is:

1. A combined sensor comprising:

a casing;

a fluid passage, wherein a fluid flows through said fluid passage from a fluid inlet to a fluid outlet of said fluid passage;

a pressure-receiving section;

a pressure-detecting section comprising a thin-wailed portion disposed in said casing, one side of said thin-walled portion being in direct contact with said fluid and having a pressure-detecting element disposed in said casing on another side of said thin-walled portion opposite to said one side for sensing said pressure of said fluid to derive a detection signal corresponding to said pressure without intervention of another fluid medium for receiving the pressure of said fluid; and a temperature-detecting element disposed in said casing for sensing a temperature of said fluid flowing through said fluid passage to derive a detection signal corresponding to said temperature, wherein said pressure-detecting element and said temperature-detecting element are arranged closely to one another on an identical surface of said pressure-receiving section.

2. The combined sensor according to claim 1, wherein:

said pressure-receiving section comprises said thin-walled section and a thick-walled section; and said thin-walled section and said thick-walled section are integrally formed.

3. The combined sensor according to claim 2, wherein said pressure-detecting element is secured to said thin-walled section, while said temperature-detecting element is secured to said thick-walled section.

4. A flow controller provided with a combined sensor, for controlling a flow rate of a fluid flowing through a fluid passage from a fluid inlet to a fluid outlet of said fluid passage, said flow controller comprising:

a control valve for controlling said flow rate of said fluid;

a throttle arranged on an outflow side of said control valve, said combined sensor arranged on an inflow side of said throttle for almost simultaneously detecting a pressure of said fluid and a temperature of said fluid flowing through said fluid passage; and a control circuit, wherein detection signals corresponding to said pressure and said temperature of said fluid sensed by said combined sensor are introduced into said control circuit respectively, and a control signal for adjusting a degree of opening of said control valve is derived from said control circuit to said control valve, and wherein said combined sensor comprises:
- a casing;
- a pressure-receiving section;
- a pressure detecting section comprising a thin-walled portion disposed in said casing, one side of said thin-walled portion being in direct contact with said fluid and having a pressure-detecting element disposed in said casing on another side of said thin-walled portion opposite to said one side for sensing said pressure of said fluid to derive a detection signal corresponding to said pressure without intervention of another fluid medium for receiving the pressure of said fluid; and
- a temperature-detecting element disposed in said casing for sensing a temperature of said fluid flowing through said fluid passage to derive a detection signal corresponding to said temperature, wherein said pressure-detecting element and said temperature-detecting element are arranged closely to one another on an identical surface of said pressure-receiving section.

5. The combined sensor according to claim 4, wherein:

said pressure-receiving section comprises said thin-walled section and a thick-walled section; and said thin-walled section and said thick-walled section are integrally formed.

6. The flow controller provided with said combined sensor according to claim 5, wherein said pressure-detecting element is secured to said thin-walled section, while said temperature-detecting element is secured to said thick-walled section.

7. A flow controller provided with combined sensors, for controlling a flow rate of a fluid flowing through a fluid passage from a fluid inlet to a fluid outlet of said fluid passage, said flow controller comprising:
- a control valve for controlling said flow rate of said fluid;
- a throttle arranged on an outflow side of said control valve;
- a pair of said combined sensors arranged on inflow and outflow sides of said throttle respectively for almost simultaneously detecting a pressure of said fluid and a temperature of said fluid flowing through said fluid passage; and
- a control circuit, wherein detection signals corresponding to said pressure and said temperature of said fluid sensed by said combined sensors are introduced into said control circuit respectively, and a control signal for adjusting a degree of said opening of said control valve is derived from said control circuit to said control valve, and wherein each of said pair of combined sensors comprises:
- a casing;
- a pressure-receiving section;
- a pressure-detecting section comprising a thin-walled portion disposed in said casing, one side of said thin-walled portion being in direct contact with said fluid and having a pressure-detecting element disposed in said casing on another side of said thin-walled portion opposite to said one side for sensing said pressure of said fluid to derive a detection signal corresponding to said pressure without intervention of another fluid medium for receiving the pressure of said fluid; and
- a temperature-detecting element disposed in said casing for sensing a temperature of said fluid flowing through said fluid passage to derive a detection signal corresponding to said temperature, wherein said pressure-detecting element and said temperature-detecting element are arranged closely to one another on an identical surface of said pressure-receiving section.

8. The combined sensor according to claim wherein:

said pressure-receiving section comprises said thin-walled section and a thick-walled section; and said thin-walled section and said thick-walled section are integrally formed.

9. The flow controller provided with said combined sensors according to claim 8, wherein said pressure-detecting element is secured to said thin-walled section, while said temperature-detecting element is secured to said thick-walled section.

* * * * *